US012077941B2

(12) United States Patent
Struss et al.

(10) Patent No.: US 12,077,941 B2
(45) Date of Patent: Sep. 3, 2024

(54) HYDRAULIC CONTROL SYSTEM, WORK MACHINE AND METHOD FOR CONTROLLING OPERATION OF A WORK ATTACHMENT

(71) Applicant: KOMATSU LTD., Tokyo (JP)

(72) Inventors: Carlo Struss, Hannover (DE); Christian Hahn, Hannover (DE)

(73) Assignee: KOMATSU LTD., Tokyo (JP)

( * ) Notice: Subject to any disclaimer, the term of this patent is extended or adjusted under 35 U.S.C. 154(b) by 1008 days.

(21) Appl. No.: 17/044,429

(22) PCT Filed: Mar. 12, 2019

(86) PCT No.: PCT/JP2019/009887
§ 371 (c)(1),
(2) Date: Oct. 1, 2020

(87) PCT Pub. No.: WO2019/207987
PCT Pub. Date: Oct. 31, 2019

(65) Prior Publication Data

US 2021/0032849 A1 Feb. 4, 2021

(30) Foreign Application Priority Data

Apr. 26, 2018 (EP) .................................... 18169532

(51) Int. Cl.
*E02F 9/20* (2006.01)
*E02F 3/34* (2006.01)
(Continued)

(52) U.S. Cl.
CPC .......... *E02F 9/2041* (2013.01); *E02F 9/2004* (2013.01); *E02F 9/2025* (2013.01);
(Continued)

(58) Field of Classification Search
CPC ..... E02F 9/2041; E02F 9/2004; E02F 9/2025; E02F 9/2221; E02F 9/2228; E02F 9/2235;
(Continued)

(56) References Cited

U.S. PATENT DOCUMENTS 9,919,424 B1 * 3/2018 Devengenzo ........ G05B 19/423
2010/0275589 A1 11/2010 Meyers et al.
(Continued)

FOREIGN PATENT DOCUMENTS

EP 01346269 B1 11/2009
EP 02586918 A2 5/2013
(Continued)

*Primary Examiner* — Thomas C Lee
(74) *Attorney, Agent, or Firm* — Faegre Drinker Biddle & Reath LLP

(57) ABSTRACT

The invention refers to a hydraulic control system for controlling operation of a work attachment of a work machine, comprising a controller configured to output a work attachment control value controlling the operation of the work attachment, an operator input device configured to output a command signal depending on the amount of actuation of the operator input device for setting the work attachment control value, a save input device configured to generate a save command signal upon actuating the save input device and a mode select input device configured to select a first mode and a second mode, wherein the controller is configured to save a constant work attachment control value, wherein the constant work attachment control value is the work attachment control value as set by the command signal upon receiving the save command signal.

14 Claims, 8 Drawing Sheets

(51) Int. Cl.

| | |
|---|---|
| ***E02F 3/43*** | (2006.01) |
| ***E02F 9/22*** | (2006.01) |
| ***F15B 11/10*** | (2006.01) |
| ***F15B 21/08*** | (2006.01) |
| ***G05G 13/00*** | (2006.01) |

(52) U.S. Cl.

CPC .......... *E02F 9/2221* (2013.01); *E02F 9/2228* (2013.01); *E02F 9/2235* (2013.01); *E02F 9/2285* (2013.01); *F15B 11/10* (2013.01); *F15B 21/082* (2013.01); *G05G 13/00* (2013.01); *E02F 3/34* (2013.01); *E02F 3/435* (2013.01); *E02F 3/438* (2013.01); *E02F 9/2296* (2013.01); *F15B 2211/20523* (2013.01); *F15B 2211/20538* (2013.01); *F15B 2211/20546* (2013.01); *F15B 2211/255* (2013.01); *F15B 2211/275* (2013.01); *F15B 2211/6346* (2013.01); *F15B 2211/6355* (2013.01)

(58) Field of Classification Search

CPC . E02F 9/2285; E02F 3/34; E02F 3/435; E02F 3/438; E02F 9/2296; F15B 11/10; F15B 21/082; F15B 2211/20523; F15B 2211/20538; F15B 2211/20546; F15B 2211/255; F15B 2211/275; F15B 2211/6346; F15B 2211/6355; G05G 13/00

See application file for complete search history.

(56) References Cited

U.S. PATENT DOCUMENTS

| | | | | |
|---|---|---|---|---|
| 2010/0292851 | A1* | 11/2010 | Reiter .................... | E02F 9/2296 700/282 |
| 2012/0004816 | A1 | 1/2012 | Okamura et al. | |
| 2017/0167513 | A1 | 6/2017 | Mcdonald et al. | |
| 2019/0248506 | A1* | 8/2019 | Scott ........................ | B64F 1/005 |

FOREIGN PATENT DOCUMENTS

| | | | |
|---|---|---|---|
| EP | 02933387 | A1 | 10/2015 |
| JP | 2006-257714 | A | 9/2006 |
| JP | 2010-007264 | A | 1/2010 |
| JP | 2014-105791 | A | 6/2014 |
| JP | 2017-187144 | A | 10/2017 |

* cited by examiner

HYDRAULIC CONTROL SYSTEM, WORK MACHINE AND METHOD FOR CONTROLLING OPERATION OF A WORK ATTACHMENT

TECHNICAL FIELD

The invention refers to a hydraulic control system for controlling operation of a work attachment of a work machine, wherein the hydraulic control system comprises a controller configured to output a work attachment control value controlling the operation of the work attachment and an operator input device operatively connected to the controller. In addition, the invention refers to a work machine comprising a work attachment, a hydraulic circuit for supplying hydraulic fluid to the work attachment, and the hydraulic control system. Furthermore, the invention refers to a method for controlling operation of a work attachment of a work machine, comprising the step of controlling the work attachment in a first mode based on an actuation amount of an operator input device.

BACKGROUND ART

Work vehicles are often configured for receiving work attachments such as a manhole cutter, a salt spreader or a gritting device. Such work attachments may have a hydraulic motor for driving a rotating member arranged on the work attachment. The hydraulic fluid for driving the rotating member is commonly provided by the work vehicle. In order to control the rotation speed of the work attachment, the amount of hydraulic fluid supplied to the work attachment needs to be controlled.

In commonly known work vehicles, two different modes for driving the work attachments are often provided. In a proportional mode, the amount of hydraulic fluid supplied to the work attachment is controlled depending on the amount of actuation of a control lever. In a continuous mode, a predetermined amount of hydraulic fluid is constantly supplied to the work attachment resulting in a constant rotation speed of the rotating member of the work attachment. The amount of fluid supplied in the continuous mode is set in advance using a separate control device. JP 2006-257714 A (PTL 1) describes an exemplary configuration of a hydraulic circuit for providing hydraulic fluid to the work attachment.

CITATION LIST

Patent Literature

PTL 1: JP 2006-257714 A

SUMMARY OF INVENTION

Technical Problem

It is an object of the present invention to simplify the handling of the work attachment, and in particular, to increase the efficiency of controlling the work attachment.

Solution to Problem

The object is solved by the hydraulic control system according to claim 1, the work machine according to claim 13 and the method according to claim 14. Preferred embodiments of the invention are described in the dependent claims.

A hydraulic control system for controlling operation of a work attachment of a work machine comprises a controller, an operator input device, and a save input device. The controller is configured to output a work attachment control value controlling the operation of the work attachment. The operator input device is operatively connected to the controller, wherein the operator input device is configured to output a command signal depending on the amount of actuation of the operator input device for setting the work attachment control value. The save input device is operatively connected to the controller, wherein the save input device is configured to generate a save command signal upon actuating the save input device. The controller is configured to save a constant work attachment control value, wherein the constant work attachment control value is the work attachment control value as set by the command signal upon receiving the save command signal.

An advantage of the hydraulic control system of the present invention is that the constant work attachment control value is set using the operator input device. This simplifies the control of the work attachment, since the operator can use the operator input device for setting both the work attachment control value and the constant work attachment control value for controlling the work attachment. For example, the operator can use the operator input device for setting the control of the operation of the work attachment depending on the specific requirements. Upon reaching the desired state of operation of the work attachment, for example the speed of the rotation of the work attachment, this setting can be saved using the save input device. Subsequently, this finely adjusted setting of the operation of the work attachment is executed. In contrast to the commonly known hydraulic control systems, the constant work attachment control value for controlling the operation of the work attachment is not set in advance, but can be tuned to the current requirements. Thus, the constant work attachment control value can be better adjusted to the given circumstances.

Preferably, the hydraulic control system is used for controlling the operation of a work attachment of a work machine. The work machine preferably is capable of travelling by its own. An embodiment of the work machine is a work vehicle such as a construction vehicle, for example a wheel loader, a hydraulic excavator or a skid steer loader. Thus, the hydraulic control system for controlling the operation of a work attachment of a work machine may also be designated as a work machine (work) attachment hydraulic control system. The work machine could be an unmanned machine which may be remotely controlled. The operator input device, the save input device, and the mode select input device may be components of a remote control for remotely controlling the unmanned work machine.

The work machine may have an engine and/or an electric motor for providing the power for driving the work machine itself and for powering the work attachment. In particular, the engine and/or the electric motor may power a hydraulic circuit for supplying hydraulic fluid to the work attachment. The hydraulic circuit may comprise a hydraulic pump for pumping the hydraulic fluid through hydraulic lines which are in fluid connection with the work attachment, such that the hydraulic fluid supplied by the hydraulic pump is fed to the work attachment. Embodiments of the hydraulic circuit are described in the following.

Preferably, the work attachment may be a member that is fixedly connected to the work machine. In a preferred embodiment, the work attachment is removably attached to the work machine. For example, the work machine comprises a boom, an arm or a combination thereof, wherein the work attachment is attached to a free end of the boom or the arm. It is also possible to attach the work attachment to a front or rear end of the work machine. Various types of attachment structures can be employed for attaching the work attachment to the work machine.

In a preferred embodiment, the work attachment is or includes a rotating member, e.g. a cutting implement. For example, the rotating member may be a cutter, for example for a manhole cutter. The rotating member can be the movable device, for example a spreader of a salt spreader or of a gritting device. The rotating member can be driven by a hydraulic motor arranged on the work attachment, whereby the hydraulic motor is driven by the hydraulic fluid provided by the hydraulic circuit of the work machine. To this end, the hydraulic motor of the work attachment can be fluidly connected to the hydraulic circuit. This fluid connection may be fixed or removable.

The controller may be implemented by a microprocessor, a computer or any other computing device. The controller may be arranged on the work machine and can be used for controlling other features of the work machine. The controller outputs a work attachment control value which is a value to set/adjust the operation of the work attachment. In particular, the work attachment control value is a value for controlling the hydraulic circuit. Hence, by setting the work attachment control value, the amount of hydraulic fluid supplied to the work attachment, in particular, the hydraulic motor, is set. By changing the work attachment control value, the amount of hydraulic fluid supplied to the work attachment can be changed. Therefore, providing a constant work attachment control value provides a constant amount of fluid supplied to the work attachment. The work attachment control value may be any signal, with which the amount of hydraulic fluid fed to the work attachment can be set or changed.

The operator input device is operatively connected to the controller. The operator input device generates a command signal which is transmitted to the controller. Depending on the command signal, the controller calculates/generates the work attachment control value. For example, there is a linear relationship between the command signal and the work attachment control value. It is also possible that the controller comprises a memory in which a table is stored defining a relationship between the command signals and the corresponding work attachment control value. The controller is preferably configured to transform the command signal into a signal with which the hydraulic circuit can be controlled.

The operator input device can also be designated as an operator setting device or switch input device, which can be operated/actuated by the operator. Further, this switch input device can be a movable switch, for example a slide switch, a button switch, lever switch or a lever. Preferably, the operator input device is a slide switch or a lever. The operator input device may be configured to be actuated by different amounts, such that the amount of actuation can be variably set by means of the operator input device. In a preferred embodiment, the operator input device may be movable between different positions, wherein the different positions are indicative of the amount of actuation. For example, the operator input device may be a mechanical switch, whereby the amount of actuation of the mechanical switch determines the value of the command signal. In this exemplary embodiment, the amount of operation corresponds to the displacement of the mechanical switch, preferably from its rest position. The operator input device is preferably arranged in a cab of the work machine, for example within reach for an operator sitting in a driving seat.

In general, the command signal can also be designated as a setting command signal. The command signal may be the amount of voltage generated by the operator input device. In this case, the amount of actuation, for example the displacement of a mechanical switch from its rest position, defines the voltage of an electric current outputted by the operator input device. This electric current is fed to the controller, whereby the controller calculates the work attachment control value depending on the amount of voltage generated by the operator input device. However, it is possible that the information of the command signal is represented by the amount of electrical current generated by the operator input signal. Furthermore, the command signal may be a digital signal generated by a processor of the operator input signal.

The save input device is also operatively connected to the controller. The save input device could be any device which is capable of generating a save command signal upon its actuation. The save input device can also be designated as a save switch device. This save input device can be operated/actuated by the operator. Further, the save input device can be a movable switch, for example a slide switch, a button switch, lever switch or a lever. Preferably, the save input device is a button switch. The save command signal may be an electric current or electric pulse which is fed to the controller. The controller is capable of recognizing the save command signal. In particular, the save input device generates the save command signal upon its actuation. For example, the save input device may be a mechanical switch, toggle or button. The save input device does not need be configured to be actuated by different actuation amounts as the operator input device since the save input device only needs to provide one signal, the save command signal, upon its actuation.

The controller preferably facilitates two modes of operation. In a first mode (can also be designated as proportional mode), the controller outputs a work attachment control value based on the command signal; this means, the work attachment control value depends on the amount of actuation of the operator input device. Hence, the work attachment control value usually changes over time, namely depending on the change of the amount of actuation of the operator input device. Thus, an operator can set and change the rotation speed of the work attachment by accordingly actuate the operator input device. In a second mode (can also be designated as continuous mode), the controller preferably outputs a constant work attachment control value, such that the operation of the work attachment is constant, for example the speed of the rotating member of the work attachment is constant over time. Preferably, this constant work attachment control value is set by changing the amount of actuation of the operator input device to the desired value (i.e. the desired operation state of the work attachment) upon which the save input device is actuated. In this instant, the save input device generates the save command signal, which is recognized by the controller, which, in turn, saves the current work attachment control value as constant work attachment control value. In the continuous mode, preferably the controller continues to output the constant work attachment control value irrespective of the amount of actuation of the operator input device; this means, a change in the amount of actuation of the operator input device does not result in a change in the work attachment control value outputted by the controller, since the controller outputs the constant work attachment control value.

As to the general understanding of the invention, the controller is also configured to output the constant work attachment control value as the work attachment control value for controlling the operation of the work attachment. Further, for controlling the operation of the work attachment the controller preferably outputs the constant work attachment control value to an actuating device for adjusting the operation of the work attachment in accordance with the constant work attachment control value. The actuating device may be a means for adjusting the operation of the work attachment, for example a control valve, an engine, a pump etc.

It is preferred that the work attachment control value is a signal to set an oil flow or oil flow rate or an oil pressure.

In a preferred embodiment, at least one of the save input device, the operator input device and the mode select input device is a movable switch movable between different positions. Preferably, the operator input device is a slide switch and that the save input device and the mode select input device is a button switch. A slide switch is movable between a plurality of positions. A button switch is movable between at least a first position and a second position. In a preferred embodiment, the save input device generates the save command signal upon reaching the second position. Preferably, the save input device can be a mechanical switch. For example, the save input device may comprise a button which is in the first position as long as the button is not actuated. By pressing the button, the button reaches the second position, upon which the save command signal is generated. However, other embodiments of the save input device are possible, e.g. a slide switch.

In a preferred embodiment, the hydraulic control system comprises a lever, wherein preferably the operator input device, the save input device and/or the mode select input device is/are arranged on the lever.

The lever may be arranged in a cab of the work machine. The lever may be part of remote control of the unmanned work machine. The lever may also be used for controlling the travel of the work machine. The amount of actuation (e.g. the amount of tilting) of the lever may define the velocity of the work machine. Furthermore, the direction of travel may be changed by using the lever. It is also possible that the lever may be alternatively or additionally used for controlling the boom and/or the arm of the work machine. Thus, upon actuation of the lever, it may be possible to move the work attachment to its current position, if the work attachment is arranged at the free end of the boom or the arm.

Since in a preferred embodiment, the operator input device and the save input device are arranged on the lever, the control of the work attachment, in particular its positioning and the setting of the operation state of the work attachment, can be controlled using only one mechanical device, namely the lever. Consequently, the operator can maintain his hand on the lever during the complete control of the work attachment. In particular, it is not necessary to remove the hand from the lever, for example, for setting the constant work attachment control value for the continuous mode, as it is necessary in the hydraulic control systems of the prior art. In particular, since both the operator input device as well as the save input device are arranged on the lever, the work attachment can be controlled both in the proportional mode as well as in the continuous mode.

It is preferred that the hydraulic control system comprises a mode select input device operatively connected to the controller and configured to select a first mode and a second mode. Preferably, in the first mode, the controller outputs a work attachment control value based on the command signal. Preferably, in the second mode, the controller outputs the constant work attachment control value when the command signal reaches a predetermined threshold.

The first mode is preferably called the proportional mode, whereas the second mode is preferably referred to as the continuous mode. The mode select input device is operatively connected to the controller. The mode select input device may be a button, wherein two positions of the button refer to the proportional mode and/or the second mode. Furthermore, the mode select input device may be a mechanical switch which can be moved between two positions, for example, a toggle switch, wherein each position of the toggle switch defines the proportional mode or the continuous mode. It is also possible that repeated actuation of the mode select input device results in a repeated switch between the modes of operation.

The mode select input device may output a selection command signal which is received by the controller. Upon receiving the respective selection command signal, the controller outputs either the work attachment control value based on the command signal outputted by the operator input device or outputs a constant work attachment control value. Hence, in the proportional mode, the work attachment control value is based on the amount of actuation of the input device.

Preferably, the output of the work attachment control value is started by the controller in the continuous mode, if the command signal reaches a predetermined threshold, i.e. if the amount of actuation of the operator input device exceeds a predetermined threshold. As long as the command signal does not reach the predetermined threshold, the controller does not output any work attachment control value or outputs a work attachment control value that corresponds to zero, such that no hydraulic fluid is fed to the work attachment.

Alternatively, the controller preferably outputs the work attachment control value as long as the command signal has not reached the predetermined threshold yet. Upon reaching the predetermined threshold, the controller outputs the constant work attachment control value, i.e. further increases in the amount of actuation of the operator input device are not reflected by the work attachment control value. This control facilitates that the speed of the work attachment may be gently increased using the operator input device whereby, upon reaching the predetermined threshold of the amount of actuation, a constant speed is maintained irrespective of any further increases in the amount of actuation of the operator input device.

The predetermined threshold may correspond to the command signal, i.e. the amount of actuation of the operator input device, which corresponds to the constant work attachment control value. However, it is possible to set the predetermined threshold in advance, for example, using a control device for controlling the controller. Such a control device may be a touchscreen which is operatively connected to the controller. The predetermined threshold can be independently set from the constant work attachment control value.

It is preferred that, in the second mode, the controller terminates outputting the constant work attachment control value when the command signal falls below the predetermined threshold.

This means that the constant work attachment control value is outputted by the controller as long as the amount of actuation of the operator input device is beyond a predetermined amount of actuation. If the amount of actuation of the operator input device, i.e. the value of the command signal, falls below the predetermined threshold, the controller stops outputting the constant work attachment control value or sets the work attachment control value to zero such that the work attachment is no longer operated, i.e. no hydraulic fluid is fed to the hydraulic motor of the work attachment.

It is also possible that, when the amount of actuation of the operator input device is below the predetermined amount of actuation, the controller stops outputting the constant work attachment control value and starts outputting the work attachment control value based on the command signal. Thus, it is possible to gently reduce the rotation speed of the work attachment by reducing the amount of operation of the operator input device.

However, other ways to stop the controller from outputting the constant work attachment control value are possible. This means, other ways for stopping operating of the work attachment in the continuous mode are possible. For example, the continuous mode is started, which corresponds to start outputting the constant work attachment control value, by actuating the operator input device by the predetermined threshold. The operation of the work attachment in the continuous mode is stopped upon further reaching the predetermined value. Thus, even if the operator input device is no longer actuated, the controller outputs the constant work attachment control value as long as the operation amount of the operator input device does not reach the predetermined threshold again.

It is also possible to force the controller to stop outputting the constant work attachment control value by actuating the mode select input device. This means, by switching from the continuous mode to the proportional mode, the controller stops outputting the constant work attachment control value.

It is preferred that the controller only saves the constant work attachment control value upon receiving the save command signal, when the first mode is selected. This means that the constant work attachment control value is set in a proportional mode by actuating the save input device.

It is preferred that the mode select input device is arranged on the lever. The arrangement of the mode select input device on the lever ensures that the complete control of the work attachment is possible by using the lever only, i.e. the hand of the operator does not have to be removed from the lever for setting the mode of operation, for setting the constant work attachment control value and for starting as well as ending the continuous mode.

It is preferred that the hydraulic control system comprises a hydraulic pump for providing hydraulic fluid to the work attachment, wherein preferably the controller controls the hydraulic pump to set an flow of hydraulic fluid according to the work attachment control value.

Preferably, the hydraulic pump may be part of the hydraulic circuit. By changing the speed of rotation of the hydraulic pump, the flow of hydraulic fluid which is fed to the hydraulic motor of the work attachment can be changed or set. Hence, the controller sets the operation of the work attachment by controlling the hydraulic pump.

It is preferred that the hydraulic control system comprises an engine, wherein preferably the hydraulic pump is a fixed displacement pump which is driven by the engine, and wherein further preferably the controller outputs the work attachment control value to the engine to set the flow of hydraulic fluid.

The amount of hydraulic fluid pumped by the hydraulic pump depends on the rotation speed of the hydraulic pump, since the hydraulic pump is a fixed displacement pump, i.e. the amount of displacement cannot be set with the hydraulic pump. For changing the rotation of the hydraulic pump, the engine speed is changed. Hence, the work attachment control value is a value for setting the engine speed. For example, the work attachment control value determines the amount of motor fuel supplied to the engine. By increasing the amount of motor fuel, rotation speed of the engine can be increased such that the amount of hydraulic fluid pumped by the fixed hydraulic pump is also increased.

It is preferred that the hydraulic pump is a variable displacement pump, wherein preferably the controller outputs the work attachment control value to the variable displacement pump to control the displacement of the variable displacement pump to set the flow of hydraulic fluid.

The variable displacement pump preferably is a part of the hydraulic circuit.

The variable displacement pump preferably is a pump with which the amount of hydraulic fluid pumped by the variable displacement pump can be changed without changing the rotation speed of the variable displacement pump. For example, a variable displacement pump comprises a swashplate, wherein the angle of the swashplate determines the amount of displacement for a given constant rotation speed. In this case, the work attachment control value is a value for setting the angle of the swashplate to set the flow of hydraulic fluid fed to the hydraulic motor of the work attachment. The variable displacement pump may be a commonly known variable displacement pump.

It is preferred that the hydraulic control system comprises a control valve for setting the flow of hydraulic fluid to the work attachment, wherein preferably the controller outputs the work attachment control value to the control valve to set the flow of hydraulic fluid.

The control valve preferably is a part of the hydraulic circuit. The control valve may be arranged in a hydraulic line connecting the hydraulic pump with the hydraulic motor of the work attachment. For example, the hydraulic pump generates a constant flow of hydraulic fluid, wherein the control valve is used for changing the flow of hydraulic fluid that is supplied to the hydraulic motor. Hence, in this case, the work attachment control value is a value to control the control valve. For example, the control valve can be a solenoid control valve (an electromechanically operated valve), such that the work attachment control value is a signal with which the solenoid control valve can be changed. Such a signal can be an EPC signal.

It is preferred that the hydraulic control system comprises an electromagnetic valve (a solenoid valve) which provides pilot pressure based on an EPC signal, wherein the work attachment control value is the EPC signal (EPC: Electronic Pressure Control).

The electromechanically operated valve sets a pilot pressure which may be used for changing the displacement amount of the variable displacement pump or the control valve. For example, the pilot pressure can be used for setting the angle of the swashplate of the variable displacement pump. Furthermore, the pilot pressure can be used for setting the control valve.

The electromagnetic valve may be arranged in a pilot pressure line which is arranged between the hydraulic pump and the variable displacement pump and the control valve, respectively. The electromagnetic valve is set using an EPC signal, wherein in this case, the work attachment control value is the EPC signal. This means, the controller outputs an EPC signal for controlling the electromagnetic valve. Hence, the controller calculates the EPC signal depending on the command signal generated by the operator input device in the proportional mode.

The invention further refers to a work machine which comprises a work attachment, a hydraulic circuit for supplying hydraulic fluid to the work attachment, and a hydraulic control system as described above for controlling the flow of the hydraulic fluid in the hydraulic circuit.

Preferably, the work machine is a construction vehicle, for example a wheel loader, a hydraulic excavator or a skid steer loader. The work machine may have an engine and/or an electric motor for providing the power for driving the work machine itself and for powering the work attachment. In particular, the engine and/or the electric motor may power a hydraulic circuit for supplying hydraulic fluid to the work attachment. The hydraulic circuit may comprise a hydraulic pump for pumping the hydraulic fluid through hydraulic lines which are in fluid connection with the work attachment, such that the hydraulic fluid supplied by the hydraulic pump is fed to the work attachment. Embodiments of the hydraulic circuit are described in the following.

The invention further refers to a method for controlling operation of a work attachment of a work machine, comprising the following steps: controlling the work attachment in a first mode based on an amount of actuation of an operator input device, saving the current amount of actuation, and controlling the work attachment in a second mode based on saved amount of actuation.

Advantageous and preferred embodiments of this method follow the advantageous and preferred embodiments of the hydraulic control system as described above. Hence, all remarks and descriptions relating to the hydraulic control system equally apply to the method. In particular, the hydraulic control system can be used for implementing the above method.

It is preferred that the step of controlling the work attachment in the second mode is started by actuating the operator input device beyond a predetermined threshold, wherein preferably controlling the work attachment in the second mode is stopped by moving the operator input device below the predetermined threshold.

Further advantages and embodiments of the invention will be described referring to the attached drawings.

DESCRIPTION OF EMBODIMENTS

Figure 1:
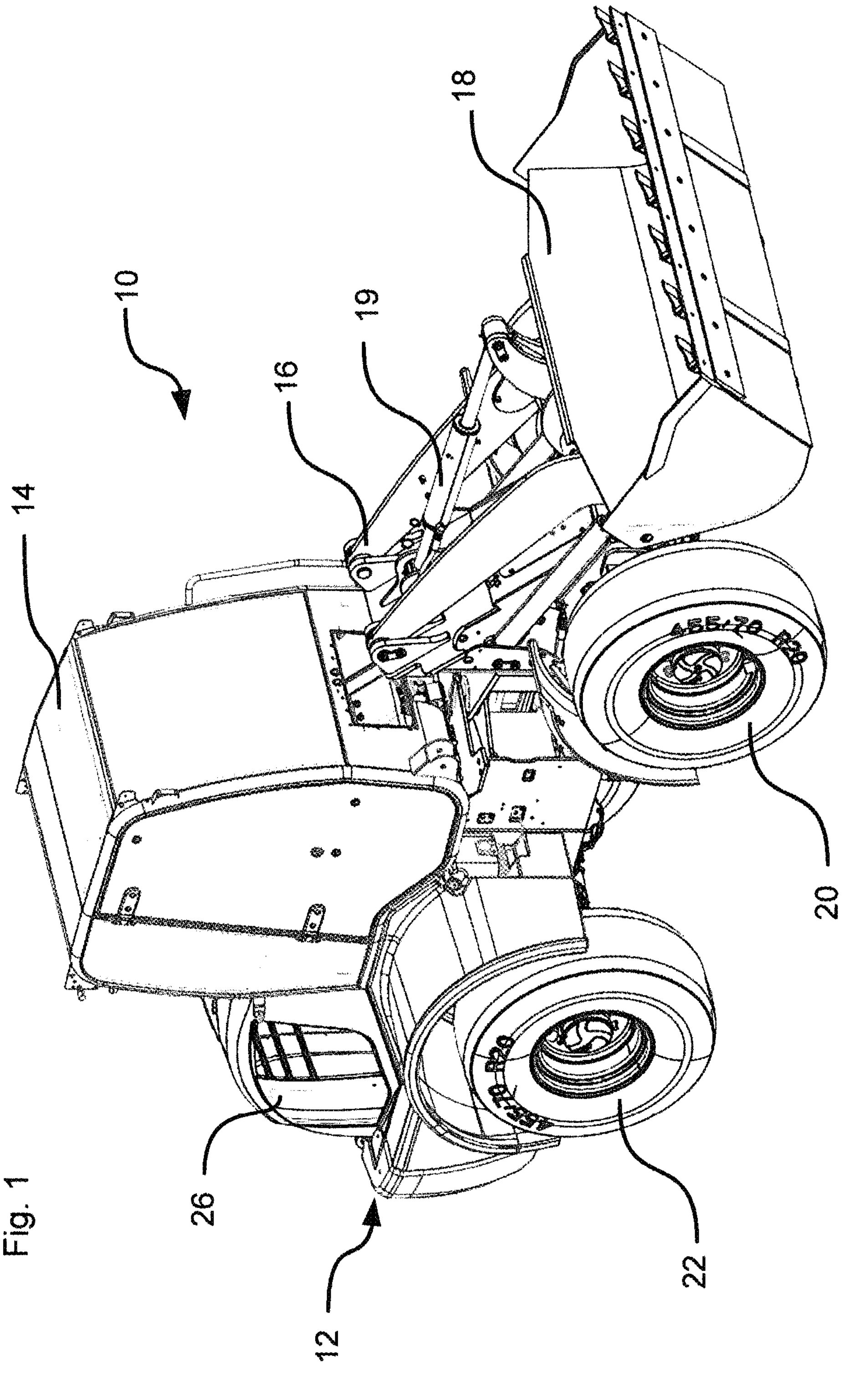
FIG. 1 shows a perspective view of a work machine.

FIG. 1 shows a wheel loader which is an example of a work machine 10. The work machine 10 comprises a vehicle body 12 which has a cab 14 arranged thereon. The cab 14 comprises a driver seat and a plurality of control instruments for controlling the functioning of the work machine 10. The work machine 10 further comprises a boom 16 and a bucket 18. The boom 16 can be raised and lowered using a hydraulic cylinder (not visible in FIG. 1). The bucket 18 is removably attached to the boom 16. The bucket 18 can be tilted with regard to the boom 16 using a tilting hydraulic cylinder 19.

The work machine 10 further comprises two front wheels 20 and two rear wheels 22. The rear wheels 22 and/or the front wheels 20 are powered by means of an engine 24, which is not visible in FIGS. 1 and 2, since it is arranged in an engine compartment covered by an engine hood 26. The engine 24 and the engine compartment are arranged behind the cab 14 in a front-rear direction of the work machine 10.

The engine 24 may be a combustion engine and/or can be constituted by an electric motor. The engine 24 provides power for driving the work machine 10, for raising and lowering the boom 16 as well as for tilting the bucket 18.

Figure 2:
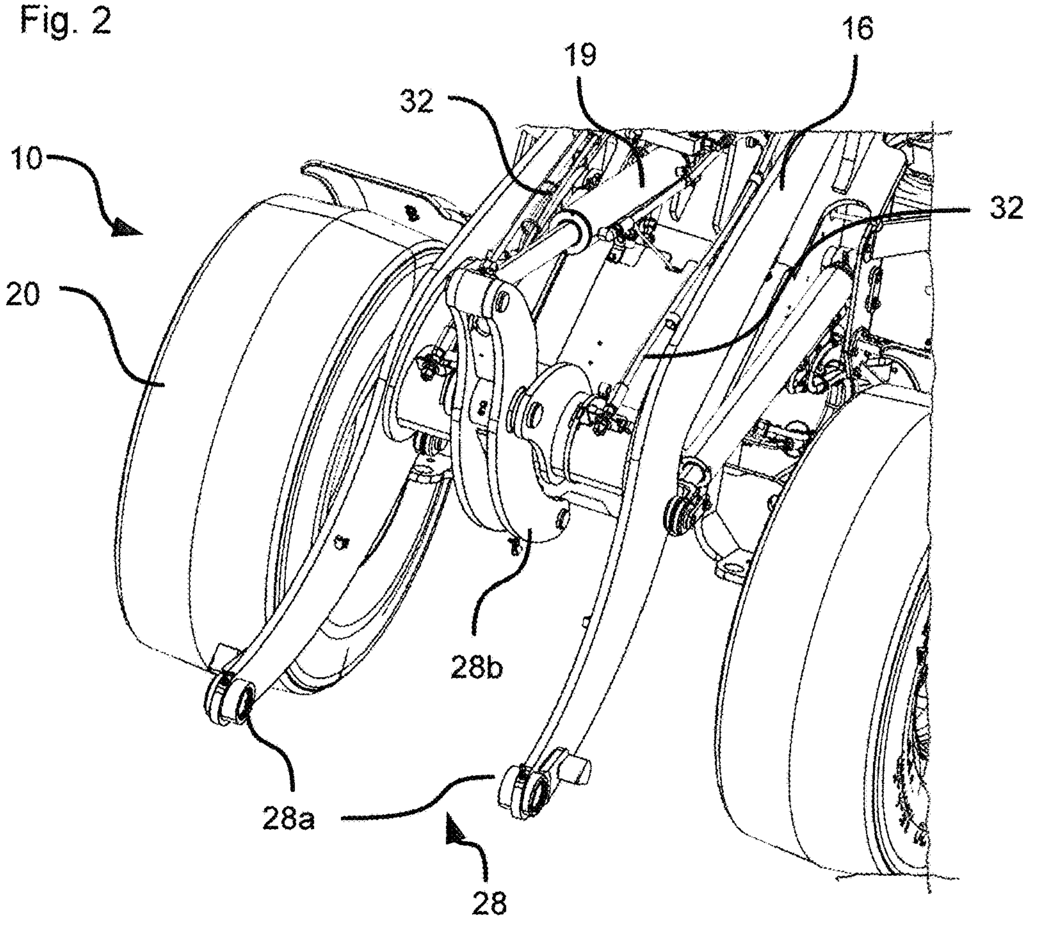
FIG. 2 shows a perspective view of a front end of the work machine with a bucket removed.
Figure 3:
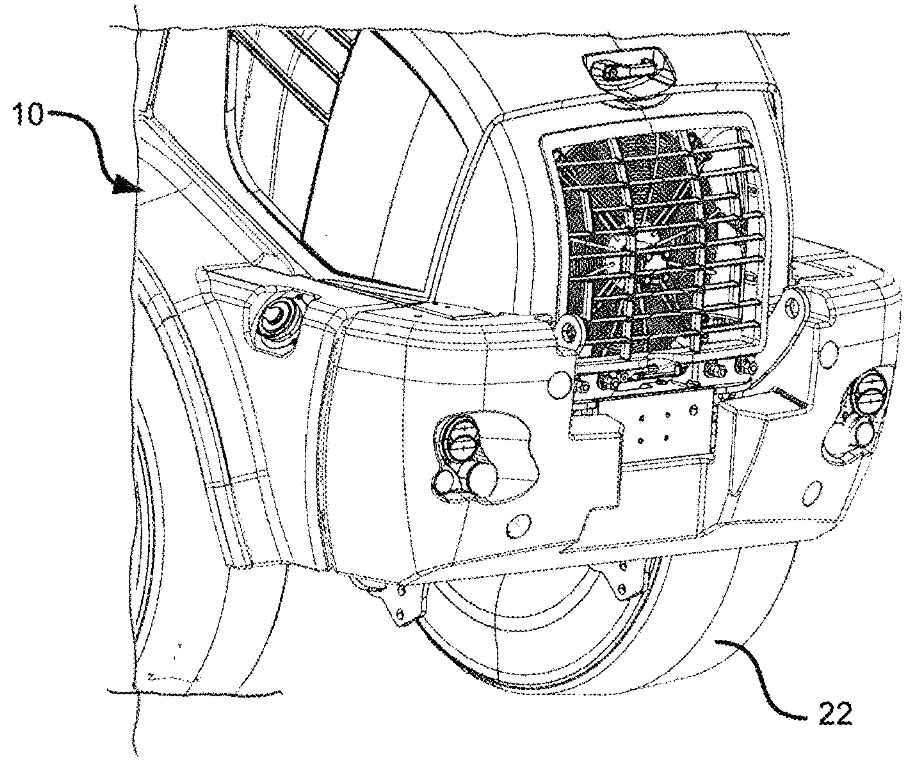
FIG. 3 shows a perspective view of rear end of the work machine.

FIG. 2 shows a front end of the work machine 10 with the bucket 18 removed. The bucket 18 is attached to the boom 16 by means of a bucket fastening structure 28. The bucket fastening structure 28 can also be used to attach a work attachment 30 which will be explained in the following. The bucket attachment structure 28 in the embodiment shown comprises two bucket openings 28*a* arranged on the boom 16 and a tilt fastening structure 28*b* which the bucket 18 can be tilted. Furthermore, two hydraulic lines 32 are arranged on the boom 16 which can be connected to the work attachment 30. Hydraulic fluid can be fed to the work attachment 30 by means of the hydraulic lines 32.

Figure 4:
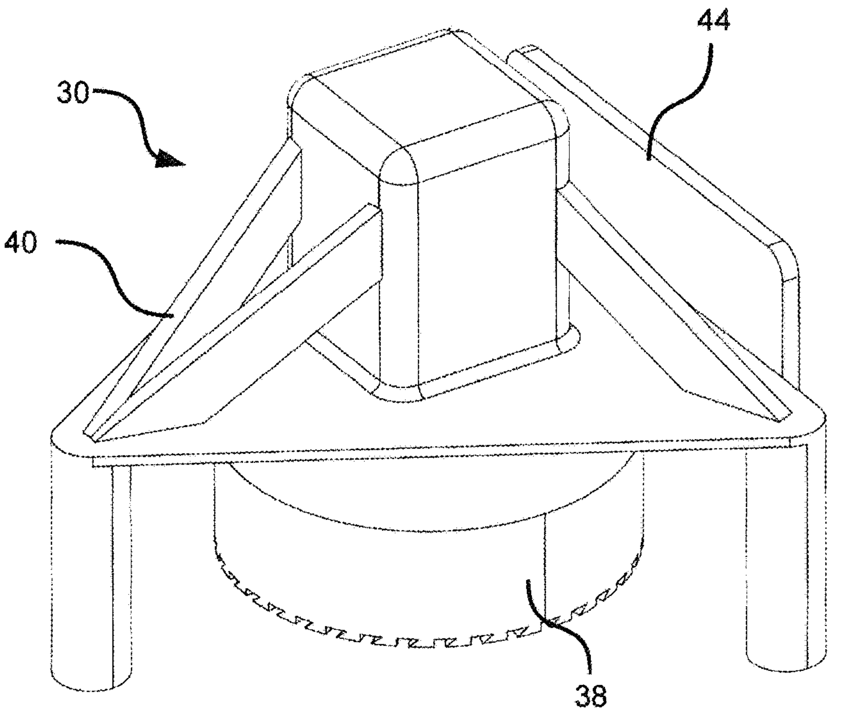
FIG. 4 shows a perspective view of a work attachment.

FIG. 4 shows a manhole cutter as an example of the work attachment 30. The work attachment 30 comprises a cutter 38 which can be rotated around an axle (not visible). The cutter 38 comprises a plurality of cutting teeth with which the cutter 38 may cut into tarmacadam. The cutter 38 is rotatably attached to a frame 40. The frame 40 holds a hydraulic motor 42 for driving the cutter 38. The hydraulic motor 42 is not visible in FIG. 4, since it is covered by the frame 40. The hydraulic motor 42 can be directly connected to the cutter 38 or indirectly, for example via a transmission.

The work attachment 30 further comprises an attachment structure 44 fixed to the frame 40 for attaching the work attachment 30, for example, to the bucket fastening structure 28. To this end, the attachment structure 44 may comprise pins which engage with the bucket openings 28*a*. The attachment structure 44 allows a removable attachment of the work attachment 30 to the work machine 10. Furthermore, the work attachment 30 also comprises hydraulic lines 32 (not shown) for connecting the hydraulic motor 42 to the hydraulic lines 32 of the work machine 10.

Figure 5:
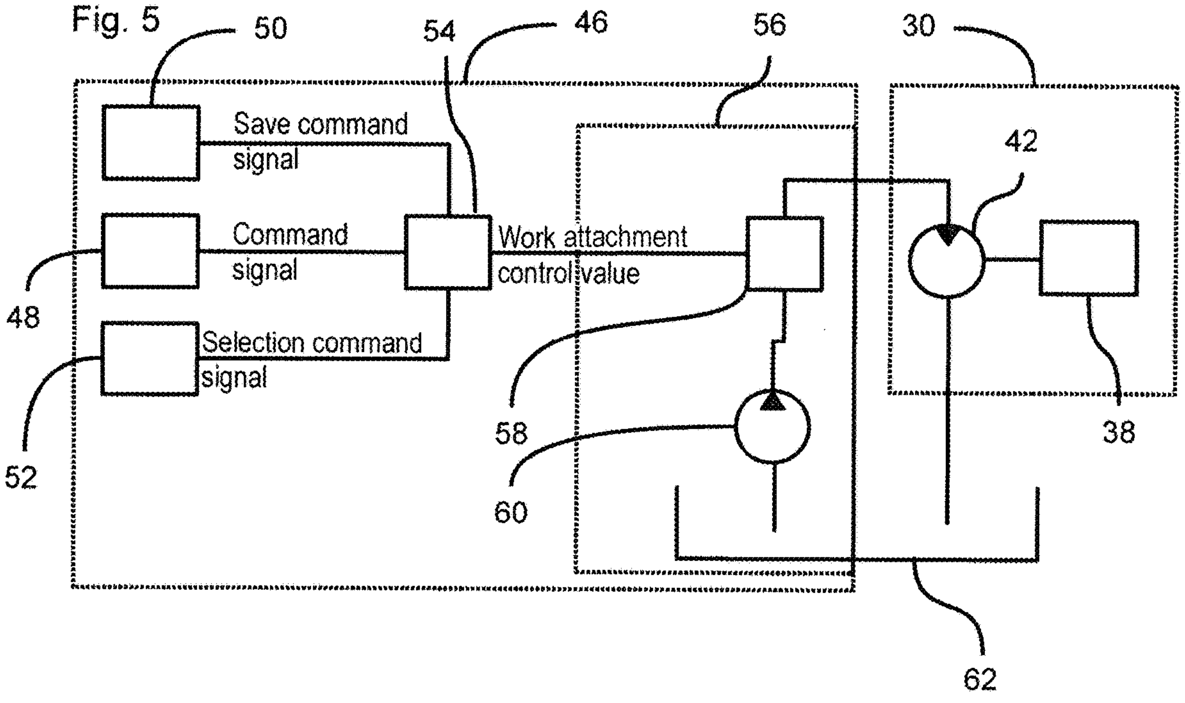
FIG. 5 shows a block diagram of a first embodiment of a hydraulic control system and the work attachment.

FIG. 5 shows an exemplary embodiment of a hydraulic control system 46 which controls the amount of hydraulic fluid fed to the work attachment 30. The hydraulic control system 46 comprises an operator input device 48, a save input device 50, a mode select input device 52, a controller 54 and a hydraulic circuit 56. The operator input device 48 is operatively connected to the controller 54, for example, by means of a wire. The operator input device 48 can be actuated such that the amount of actuation can be changed. For example, the operator input device 48 is device which can be moved between different positions, as will be discussed in the following with reference to FIGS. 11 and 12. The operator input device 48 outputs a command signal, which is indicative of the amount of operation. The command signal is forwarded to the controller 54.

The save input device 50 is also operatively connected to the controller 54, for example, by means of a wire. The save input device 50 is movable between a first position and a second position, wherein the save input device 50 generates a save command signal upon reaching the second position. For example, the save input device 50 is a button whereby the first position is the non-pressed position and the second position is reached when the button is pressed. Embodiments of the save input device 50 are discussed in conjunction with FIGS. 11 and 12 in the following. The save input device 50 generates a save command signal which is forwarded to the controller 54.

The mode select input device 52 is operatively connected to the controller 54, for example, by means of a wire. The mode select input device 52 is provided to select between a first mode and a second mode. The mode select input device 52 may be configured as a button, wherein pressing the button switches between the first mode and the second mode. Furthermore, the mode select input device 52 may be configured to have two different positions, wherein each position indicates a respective mode. For example the mode select input device 52 is configured as a button having two positions, wherein each position indicates a respective mode. The mode select input device 52 generates a selection command signal which is forwarded to the controller 54.

The controller 54 outputs a work attachment control value which is forwarded to the hydraulic circuit 56 for setting the flow of hydraulic fluid which is supplied to the work attachment 30. The controller 54 may be configured as a computer, a microprocessor or any other suitable electronic device.

The controller 54 is capable of working in two different modes. In a first mode, also referred to as a proportional mode, the controller 54 outputs a work attachment control value which is indicative of the command signal generated by the operator input device 48. For example, the work attachment control value linearly increases with an increase in the command signal. Preferably, the more the operator input device 48 is actuated, the higher the command signal gets and the more the work attachment control value increases. For example, there is a linear relationship between the amount of actuation and the work attachment control value.

In a second mode, also often referred to as a continuous mode, the controller 54 outputs a constant work attachment control value. The constant work attachment control value is set by operating the controller 54 in the proportional mode and actuating the save input device 50. Upon receiving the save command signal from the save input device 50, the controller 54 saves the current work attachment control value based on the current command signal generated by the operator input device 48 as the constant work attachment control value. Upon actuating the mode select input device 52, the controller 54 then switches to the continuous mode. The working principle of the hydraulic control system 46 according to the invention will be discussed in the following, in particular in conjunction with FIG. 9.

The hydraulic circuit 56 of the embodiment shown in FIG. 5 comprises a control valve 58, a hydraulic pump 60, and a fluid reservoir 62. The hydraulic pump 60 may be a fixed displacement pump and sucks hydraulic fluid from the fluid reservoir 62. The hydraulic pump 60 pumps the hydraulic fluid through the hydraulic line 32 in which the control valve 58 is arranged. For changing the amount of hydraulic fluid which is fed to the hydraulic motor 42 of the work attachment 30, the degree of opening of the control valve 58 is changed. Hence, in this embodiment, the work attachment control value is a signal for setting the opening degree of the control valve 58. The control valve 58 may be a solenoid valve (electromagnetically operated valve), which is controlled by an EPC signal (EPC: Electronic Pressure Control). Thus, in this particular embodiment, the work attachment control value is an EPC signal.

Figure 6:
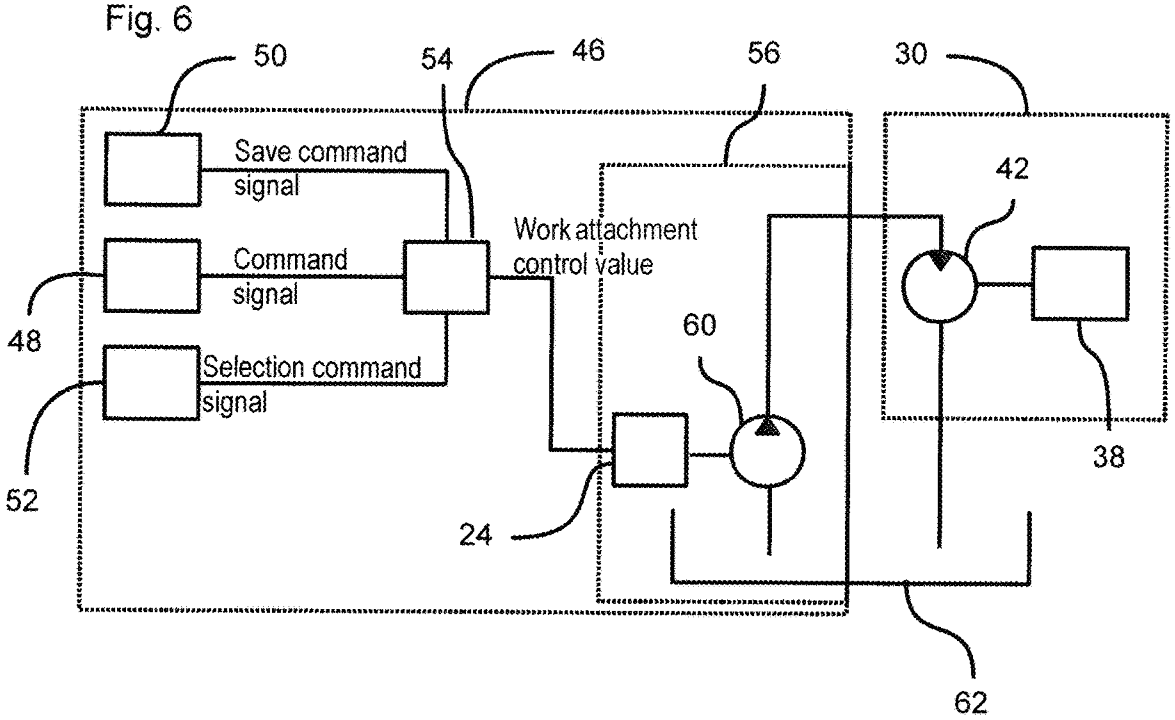
FIG. 6 shows a block diagram of a second embodiment of a hydraulic control system and the work attachment.

A further embodiment of the hydraulic control system 46 is depicted in FIG. 6. The hydraulic control system 46 of FIG. 6 is identical to the hydraulic control system 46 of FIG. 5 except for the following differences. The hydraulic circuit 56 of the hydraulic control system 46 of FIG. 6 does not comprise a control valve 58 compared to the hydraulic circuit 56 as shown in FIG. 5. The hydraulic pump 60 of the hydraulic control system 46 of FIG. 6 is a fixed displacement pump which is connected to the engine 24. For setting the flow of hydraulic fluid fed to the hydraulic motor 42 of the work attachment 30, the engine speed of the engine 24 is accordingly set. For example, the amount of fuel for the engine 24 is changed depending on the work attachment control value. Hence, in this embodiment, the work attachment control value defines the amount of fuel which is supplied to the engine 24. By setting the engine speed, the amount of hydraulic fluid supplied to the hydraulic motor 42 is set.

Figure 7:
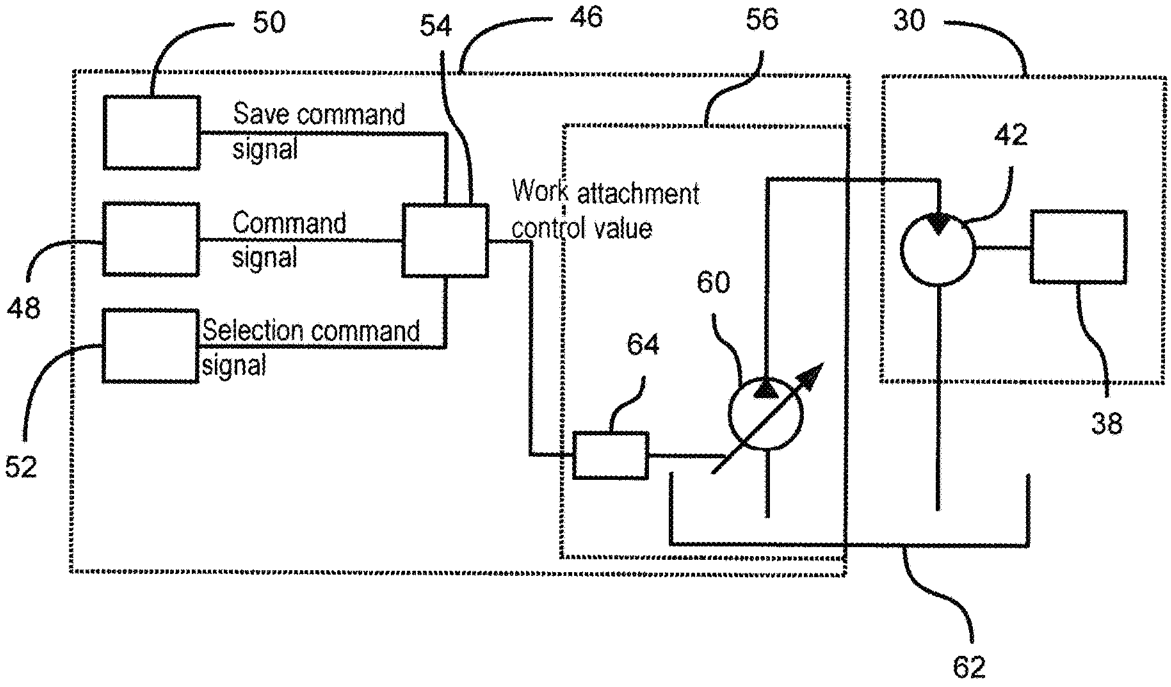
FIG. 7 shows a block diagram of a third embodiment of a hydraulic control system and the work attachment.

The hydraulic control system 46 of the embodiment shown in FIG. 7 is identical to the hydraulic control system 46 as shown in FIG. 5 except for the following differences. The hydraulic circuit 56 of the embodiment shown in FIG. 7 comprises a variable displacement pump as the hydraulic pump 60 but no control valve 58. Furthermore, the hydraulic circuit 56 comprises an actuator 64 for changing the displacement of the hydraulic pump 60. In particular, the hydraulic pump 60 comprises a swashplate whose angle can be changed using the actuator 64. By changing the angle of the swashplate, the amount of hydraulic fluid displaced by the hydraulic pump 60 can be changed while maintaining a constant engine speed. The work attachment control value in the embodiment as shown in FIG. 7 is a signal driving the actuator 64 for setting the angle of the swashplate of the hydraulic pump 60.

Figure 8:
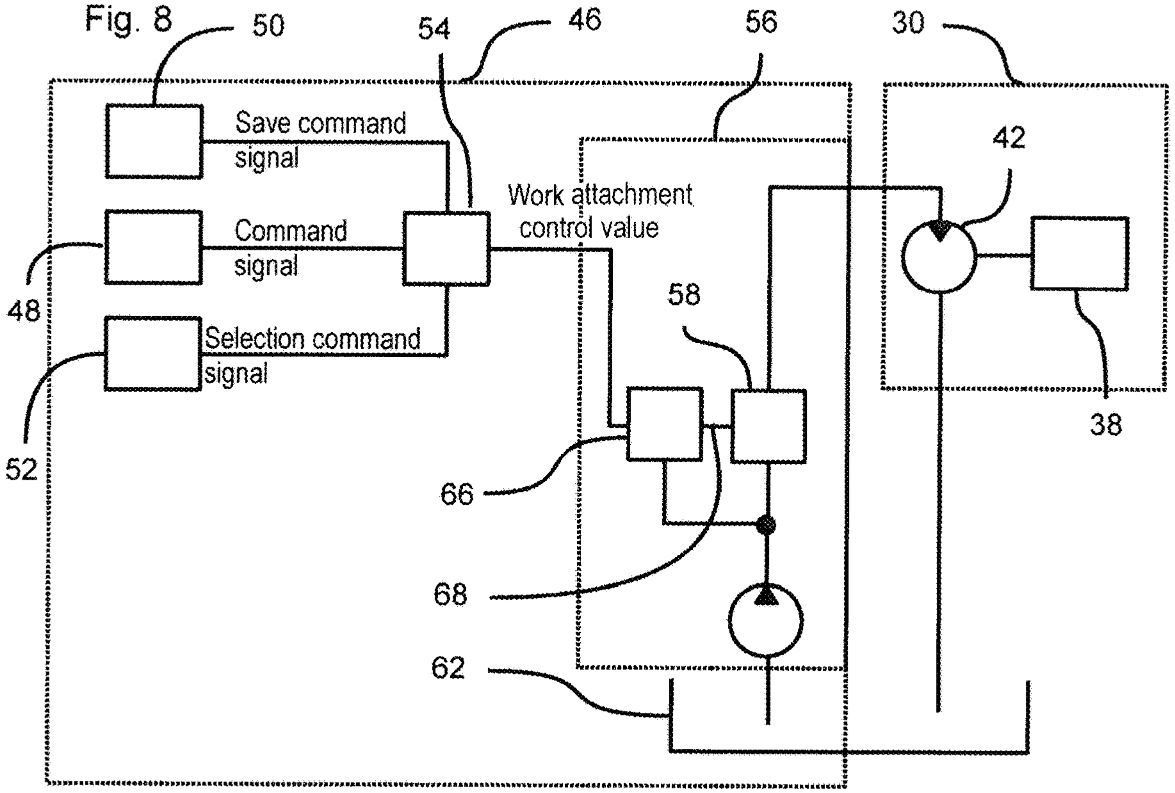
FIG. 8 shows a fourth embodiment of a hydraulic control system and the work attachment.

FIG. 8 shows another embodiment of a hydraulic circuit 56. The hydraulic circuit 56 as shown in FIG. 8 is identical to the hydraulic circuit 56 as shown in FIG. 5 except for the following differences. The hydraulic circuit 56 of the hydraulic control system 46 as shown in FIG. 8 comprises a control valve 58 whose degree of opening is set by pilot pressure. The pilot pressure is changed using a pilot pressure control valve 66. Hence, the hydraulic circuit 56 of FIG. 8 comprises a pilot pressure line 68 which guides some hydraulic fluid from the pilot pressure control valve 66 to the control valve 58. The pilot pressure control valve 66 may be an electromagnetic valve (solenoid valve) which changes its degree of opening depending on an EPC signal. Hence, in the current embodiment, the work attachment control value is an EPC signal. By changing the opening degree of the pilot pressure control valve 66, the amount of hydraulic fluid in the pilot pressure line 68 is changed, which in turn changes the degree of opening of the control valve 58. In this way, the amount of hydraulic fluid fed to the hydraulic motor 42 can be set.

Figure 9:
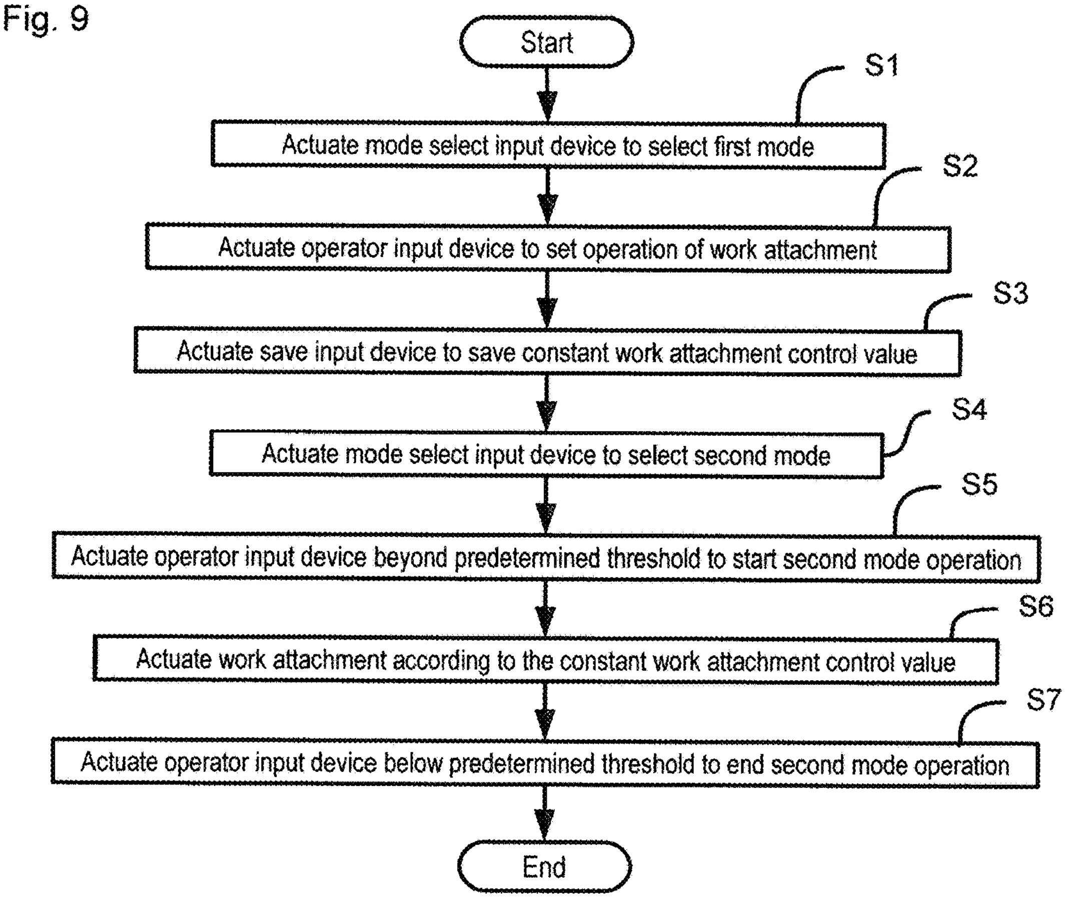
FIG. 9 shows a flow chart showing a method for controlling a work attachment according to the invention.
Figure 10:
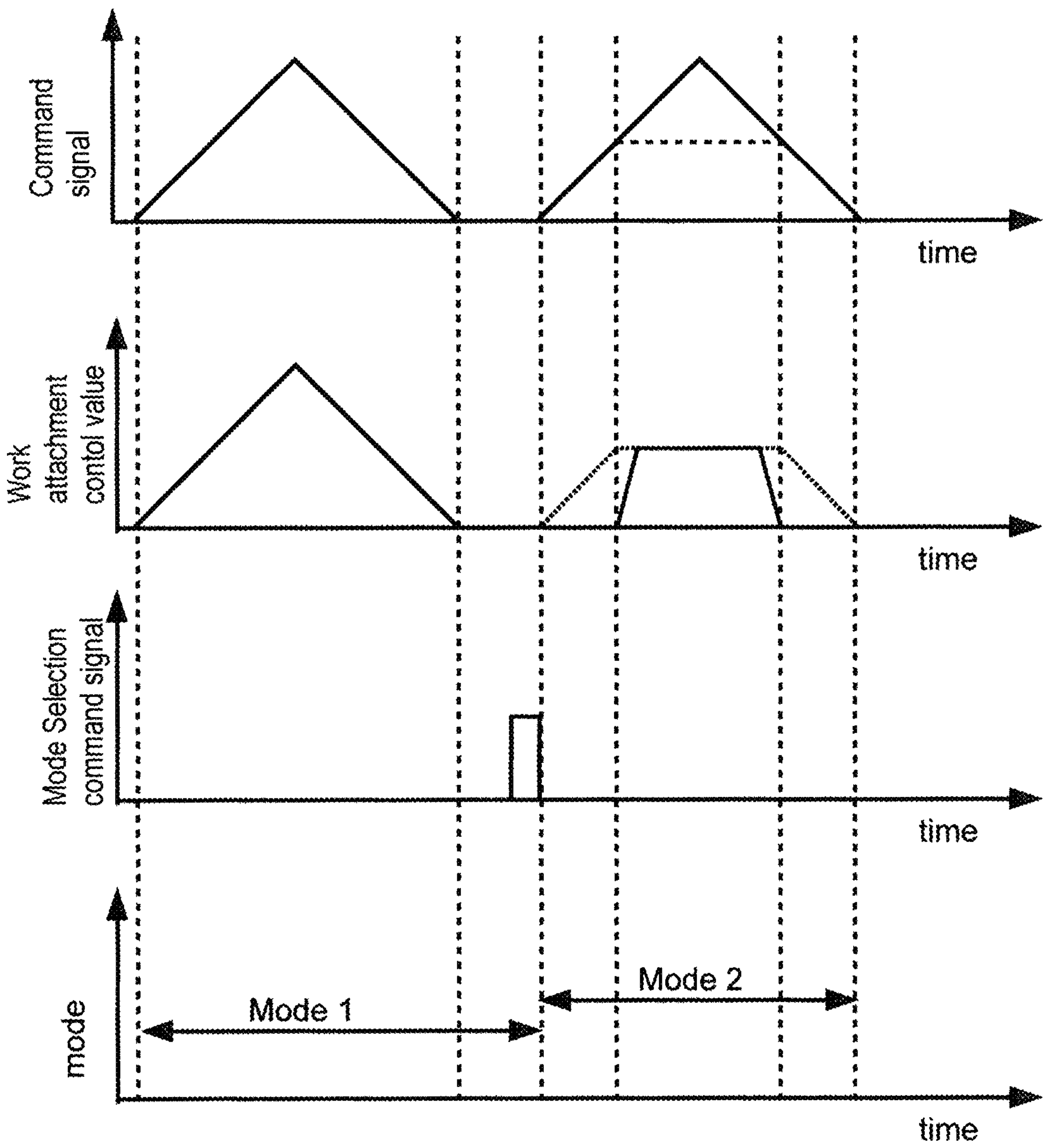
FIG. 10 shows several diagrams highlighting the functioning of the hydraulic control system.

The working principle of the hydraulic control system 46 of the current invention will be discussed in the following in conjunction with FIGS. 9 and 10. To start, an operator presses the mode select input device 52 to select the first mode (see step S1). Upon actuation, the mode select input device 52 outputs the selection command signal to the controller 54 such that the controller 54 works in the first mode or proportional mode.

For setting the rotation speed of the hydraulic motor 42 and thus of the cutter 38 of the work attachment 30, the operator changes the amount of operation of the operator input device 48 (see step S2). Depending on the amount of operation of the operator input device 48, a respective command signal is generated which is forwarded to the controller 54. The controller 54 outputs a work attachment control value depending on the amount of the command signal. In particular, as shown in FIG. 10, the work attachment control value linearly depends on the amount of the command signal. For example, the work attachment control value increases upon an increase in the value of the command signal. By changing the amount of actuation of the operator input device 48, the operation of the work attachment 30 is set. In particular, it is possible to adjust the rotation speed of the cutter 38 of the work attachment 30 by changing the amount of operation of the operator input device 48.

After setting the amount of operation of the operator input device 48 as required, the operator presses the save input device 50. The save input device 50 then generates the save command signal. Upon receiving the save command signal, the controller 54 saves the work attachment control value as currently outputted to the hydraulic circuit 56 as the current work attachment control value (see step S3).

If the operator decides to operate the work attachment 30 no longer in the proportional mode, the operator operates the mode select input device 52 upon which it generates the selection command signal (see step S4). Upon receiving the selection command signal, the controller 54 operates in the second mode, i.e. the continuous mode.

To initiate the controller 54 to output the constant work attachment control value, the operator operates the operator input device 48 by an amount of actuation which is greater than a predetermined threshold (see step S5). If the controller 54 receives a command signal whose value is beyond the predetermined threshold, the controller 54 starts outputting the constant work attachment control value as indicated in FIG. 10 (see step S6). The controller 54 stops outputting the constant work attachment control value, if the amount of actuation of the operator input device 48 falls below the predetermined threshold (see step S7).

Alternatively, as indicated by the dotted lines in FIG. 10, the controller 54 outputs the current work attachment control value even in the second mode, if the command signal is below the predetermined threshold. If the command signal, i.e. the amount of actuation is beyond the predetermined threshold, the controller 54 outputs the constant work attachment control value irrespective whether the command signal further increases. Hence, in the continuous mode, the work attachment control value outputted by the controller 54 does not linearly depend on the amount of the command signal. In this embodiment, if the amount of the command signal falls below the predetermined threshold, the controller 54 outputs a work attachment control value depending on the command signal, i.e. as done in the proportional mode.

Figure 11:
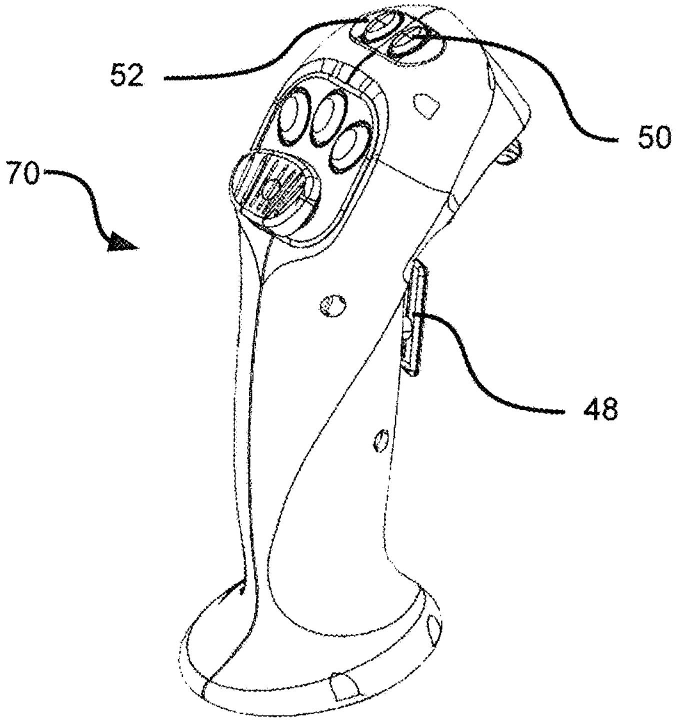
FIG. 11 shows a front perspective view of a lever.
Figure 12:
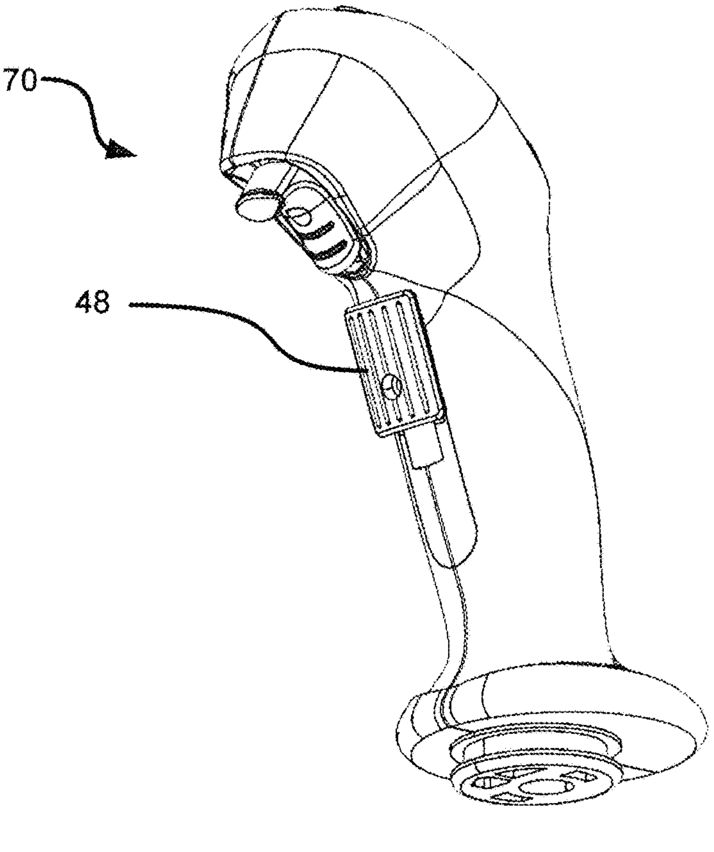
FIG. 12 shows a rear perspective view of the lever.

FIGS. 11 and 12 show a front and rear perspective view of a lever 70. The lever 70 may be arranged in the cab 14. The lever 70 can be tilted for controlling the travel of the work machine 10, for raising/lowering the boom 16, and/or for tilting the bucket 18.

The operator input device 48, the save input device 50 and the mode select input device 52 are arranged on the lever 70. In the embodiment shown in FIGS. 11 and 12, the operator input device 48 is a slide switch which can be actuated in the left-right direction. The amount of displacement from the rest position as shown in FIGS. 11 and 12 defines the amount of actuation. The operator input device 48 is arranged on the rear side of the lever 70 to be actuated by a middle finger of the operator.

The save input device 50 preferably is a push button arranged on the lever 70. Similarly, the mode select input device 52 preferably is also a push button arranged on the same lever. The save input device 50 and mode select input device 52 are arranged on the front side of the lever 70 to be actuated by a thumb of the operator. The lever 70 may be part of a remote control for remotely controlling the work machine 10.

Since all input devices 48, 50 and 52 necessary for controlling the work attachment 30 are arranged on the lever 70, it is not necessary to remove the hand from the lever 70 for controlling the work attachment 30 both in the first mode as well as in the second mode.

Figure 13:
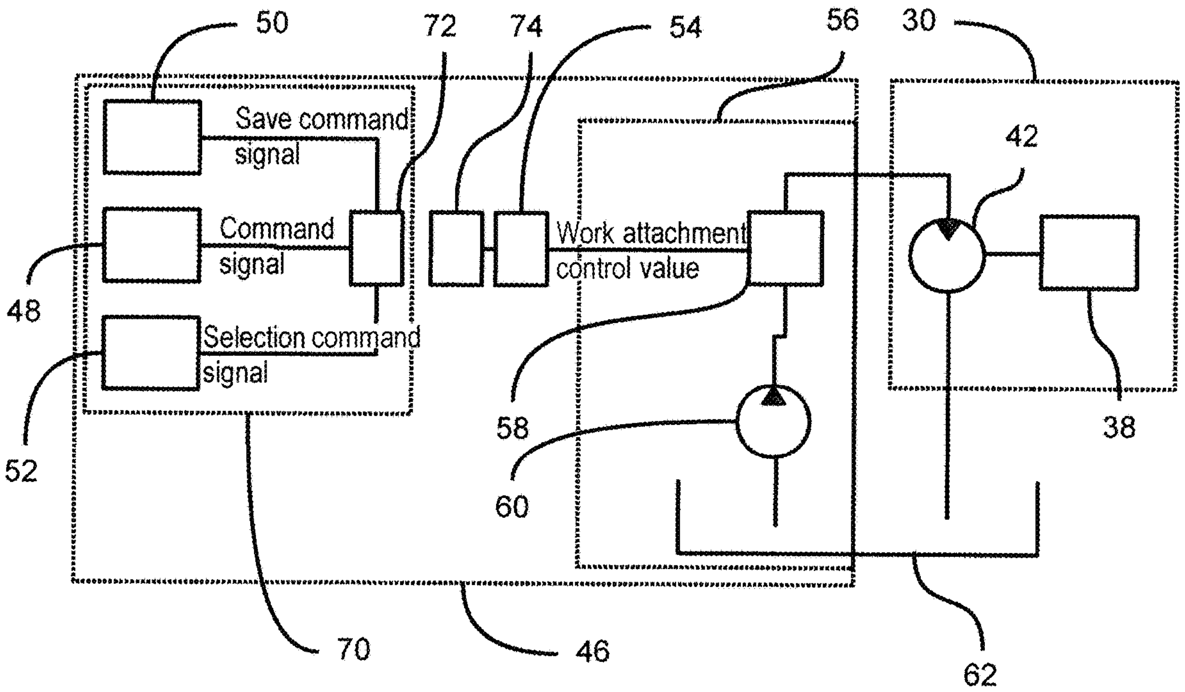
FIG. 13 shows a fifth embodiment of a hydraulic control system and the work attachment.

The hydraulic control system 46 of the embodiment shown in FIG. 13 is identical to the hydraulic control system 46 as shown in FIG. 5 except for the following differences. The save command signal, the command signal, and the selection command signal are wireless transmitted to the controller 54. To this end, the operator input device 48, the save input device 50, and the mode select input device 52 could be connected to a transmitter 72, such as infrared radiation (IR) transmitter or a radio transmitter, by means of wires. The operator input device 48, the save input device 50, the mode select input device 52, and the transmitter 72 could be components of the lever 70. The transmitter 72 wirelessly outputs the save command signal, the command signal, and the selection command signal. It is also possible that the operator input device 48, the save input device 50, and the mode select input device 52 each comprise a transmitter 72 for sending the save command signal, the command signal, and the selection command signal, respectively.

The save command signal, the command signal, and the selection command signal sent by the transmitter 72 are received by a receiver 74 which is adapted to receive the signals emitted by the transmitter 72. The receiver 74 is connected to the controller 54 by means of a wire and forwards the received signals to the controller 54.

An advantage of the hydraulic control system of the present invention is that the constant work attachment control value is set using the operator input device 48. This simplifies the control of the work attachment 30, since the operator can use the operator input device 48 for setting both the work attachment control value in the proportional mode and the constant work attachment control value for controlling the work attachment 30 in the continuous mode. For example, the operator can use the operator input device 48 in the proportional mode for setting the control of the operation of the work attachment 30 depending on the specific requirements. Upon reaching the desired state of operation of the work attachment 30, for example the speed of the rotation of the work attachment 30, this setting can be saved using the save input device 50. Upon switching to the continuous mode, this finely adjusted setting of the operation of the work attachment 30 is executed. In contrast to the commonly known hydraulic control systems, the constant work attachment control value for controlling the operation of the work attachment 30 in the continuous mode is not set in advance, but can be tuned to the current requirements. Thus, the constant work attachment control value can be better adjusted to the given circumstances.

Furthermore, the operator does not need to release the operator input device 48 for setting the constant work attachment control value, but uses the same operator input device 48 for both setting the work attachment control value in the proportional mode and in the continuous mode.

REFERENCE SIGNS LIST

10 work machine; 12 vehicle body; 14 cab; 16 boom; 18 bucket; 19 tilting hydraulic cylinder; 20 front wheel; 22 rear wheel; 24 engine; 26 engine hood; 28 bucket fastening structure; 28*a* bucket opening; 28*b* tilt fasting structure; 30 work attachment; 32 hydraulic line; 38 cutter; 40 frame; 42 hydraulic motor; 44 attachment structure; 46 hydraulic control system; 48 operator input device; 50 save input device; 52 mode select input device; 54 controller; 56 hydraulic circuit; 58 control valve; 60 hydraulic pump; 62 fluid reservoir; 64 actuator; 66 pilot pressure control valve; 68 pilot pressure line; 70 lever.

The invention claimed is:

1. A hydraulic control system for controlling operation of a work attachment of a work machine, comprising:

a controller configured to output a work attachment control value controlling the operation of the work attachment, an operator input device operatively connected to the controller, wherein the operator input device is configured to output a command signal depending on an amount of actuation of the operator input device for setting the work attachment control value, a mode select input device operatively connected to the controller and configured to select a first mode and a second mode, and a save input device operatively connected to the controller, wherein the save input device is configured to generate a save command signal upon actuating the save input device, wherein the controller is configured to save a constant work attachment control value, wherein the constant work attachment control value is the work attachment control value as set by the command signal upon receiving the save command signal, in the first mode, the controller outputs the work attachment control value based on the command signal, and in the second mode, the controller outputs the constant work attachment control value when the command signal reaches a predetermined threshold.

2. The hydraulic control system according to claim 1 characterized in that, in the second mode, the controller terminates outputting the constant work attachment control value when the command signal falls below the predetermined threshold.

3. The hydraulic control system according to claim 1 characterized in that the controller only saves the constant work attachment control value upon receiving the save command signal, when the first mode is selected.

4. The hydraulic control system according to claim 1 characterized in that at least one of the save input device, the operator input device and the mode select input device is a movable switch movable between different positions.

5. The hydraulic control system according to claim 1 characterized in that the operator input device is a slide switch and that the save input device and the mode select input device is a button switch.

6. The hydraulic control system according to claim 1 characterized by a lever, wherein the operator input device, the save input device and/or the mode select input device is/are arranged on the lever.

7. The hydraulic control system according to claim 1 characterized by a hydraulic pump for providing hydraulic fluid to the work attachment, wherein the controller controls the hydraulic pump to set a flow of the hydraulic fluid according to the work attachment control value.

8. The hydraulic control system according to claim 7 characterized by an engine, wherein the hydraulic pump is a fixed displacement pump which is driven by the engine, and wherein the controller outputs the work attachment control value to the engine to set the flow of the hydraulic fluid.

9. The hydraulic control system according to claim 7 characterized in that the hydraulic pump is a variable displacement pump, wherein the controller outputs the work attachment control value to the variable displacement pump to control the displacement of the variable displacement pump to set the flow of the hydraulic fluid.

10. The hydraulic control system according to claim 1 characterized by a control valve for setting a flow of hydraulic fluid to the work attachment, wherein the controller outputs the work attachment control value to the control valve to set the flow of the hydraulic fluid.

11. The hydraulic control system according to claim 9 characterized by an electromagnetic valve which provides pilot pressure based on an EPC signal, wherein the work attachment control value is the EPC signal.

12. A work machine, comprising:

a work attachment, a hydraulic circuit for supplying hydraulic fluid to the work attachment, and a hydraulic control system according to claim 1 for controlling a flow of the hydraulic fluid in the hydraulic circuit.

13. A method for controlling operation of a work attachment of a work machine, comprising the following steps:

outputting a work attachment control value controlling operation of the work attachment, outputting a command signal depending on an amount of actuation of an operator input device for setting the work attachment control value, selecting between a first mode and a second mode by operation of a mode selection input device, generating a save command signal upon actuating a save input device, saving a constant work attachment control value, wherein the constant work attachment control value is the work attachment control value as set by the command signal upon receiving the save command signal, wherein in the first mode, outputting the work attachment control value based on the command signal, and in the second mode, outputting the constant work attachment control value when the command signal reaches a predetermined threshold.

14. The method according to claim 13, characterized in that controlling, in the second mode, terminating outputting the constant work attachment control value when the command signal falls below the predetermined threshold.

* * * * *